(12) United States Patent
Shimada et al.

(10) Patent No.: US 6,275,778 B1
(45) Date of Patent: Aug. 14, 2001

(54) LOCATION-FORCE TARGET PATH CREATOR

(75) Inventors: Akira Shimada, Chiba; Tsutomu Mita, Tokyo, both of (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 09/030,040

(22) Filed: Feb. 25, 1998

(30) Foreign Application Priority Data

Feb. 26, 1997 (JP) .................................... 9-058282

(51) Int. Cl.$^7$ .................................................. G05B 19/00
(52) U.S. Cl. ................ 702/41; 702/151; 702/177; 100/245; 100/253; 100/260
(58) Field of Search .................. 702/41, 33, 36, 702/94, 95, 113–115, 142, 150–153, 176, 178, 177, FOR 103, FOR 123, FOR 124, FOR 136, FOR 145, FOR 146, FOR 150, FOR 151, FOR 154, FOR 170, FOR 171; 901/2, 3, 5, 8, 9; 700/245–257, 302, 304, 306, 260–263

(56) References Cited

U.S. PATENT DOCUMENTS

| 4,773,025 | * | 9/1988 | Penkar et al. | 700/252 |
| 4,774,445 | * | 9/1988 | Penkar | 700/252 |
| 5,544,282 | * | 8/1996 | Chen et al. | 700/255 |
| 5,988,850 | * | 11/1999 | Kumiya | 700/252 |

* cited by examiner

*Primary Examiner*—Hal Wachsman
(74) *Attorney, Agent, or Firm*—Adams & Wilks

(57) ABSTRACT

A location-force target path creator creates a smooth target path function from target values among values of location, position, force and moment given for a force control system. The target values are set as nodes together with times for which the target values are applied. The nodes are projected onto a time axis having a time region which is divided into a series of time regions. A target path function is calculated for an element motion by applying a boundary condition to each of the time regions.

12 Claims, 11 Drawing Sheets suppose a function $t = t_e - t_o : 0 \sim t_e$ $t_e$ = motion time during element motion $t_o$ = initial time of corresponding element motion $P(t) = a_0 + a_1 t + a_2 t^2 + a_3 t^3$ $V(t) = a_1 + 2a_2 t + 3a_3 t^2$ ↓ providing restricting conditions $P(0) = a_0$ $P(t_e) = a_0 + a_1 t_e + a_2 t_e^2 + a_3 t_e^3$ $V(0) = a_1$ $V(t_e) = a_1 + 2a_2 t_e + 3a_3 t_e^2$ ↓ coefficient being determined
(= target path function being determined)

$P(t_e) = a_0 + a_1 t_e + a_2 t_e^2 + a_3 t_e^3$ $a_0 = P(0), \quad a_1 = V(0)$ $a_2 = \dfrac{3P(t_e) - 3P(0) - (V(t_e) + 2V(0)) t_e}{t_e^2}$ $a_3 = \dfrac{2P(0) - 2P(t_e) + (V(t_e) + V(0)) t_e}{t_e^3}$

Fig. 7 suppose a function $t = t_c - t_o : 0 \sim t_e$ $t_c$ = motion time during element motion $t_o$ = initial time of corresponding element motion $P(t) = a_0 + a_1 t + a_2 t^2 + a_3 t^3 + a_4 t^4 + a_5 t^5$ $V(t) = a_1 + 2a_2 t + 3a_3 t^2 + 4a_4 t^3 + 5a_5 t^4$ $A(t) = 2a_2 + 6a_3 t + 12a_4 t^2 + 20a_5 t^3$ ↓ providing restricting conditions $P(0) = a_0$ $P(t_e) = a_0 + a_1 t_e + a_2 t_e^2 + a_3 t_e^3 + a_4 t_e^4 + a_5 t_e^5$ $V(0) = a_1$ $V(t_e) = a_1 + 2a_2 t_e + 3a_3 t_e^2 + 4a_4 t_e^3 + 5a_5 t_e^4$ $A(0) = 2a_2$ $A(t_e) = 2a_2 + 6a_3 t_e + 12a_4 t_e^2 + 20a_5 t_e^3$ ↓ coefficient being determined
(= target path function being determined)

$P(t_e) = a_0 + a_1 t_e + a_2 t_e^2 + a_3 t_e^3 + a_4 t_e^4 + a_5 t_e^5$ $a_0 = P(0), \; a_1 = V(0), \; a_2 = A(0)/2$ $a_3 = \dfrac{20P(t_e) - 20P(0) - (8V(t_e) + 12V(0))\, t_e - (3A(0) - 2A(t_e))t_e^2}{2t_e^3}$ $a_4 = \dfrac{30P(0) - 30P(t_e) + (14V(t_e) + 16V(0))\, t_e + (3A(0) - 2A(t_e))t_e^2}{2t_e^4}$ $a_5 = \dfrac{12P(t_e) - 12P(0) - (6V(t_e) + 6V(0))\, t_e - (A(0) - A(t_e))t_e^2}{2t_e^5}$

Fig. 8

LOCATION-FORCE TARGET PATH CREATOR

BACKGROUND OF THE INVENTION

The present invention relates to location-force target path creators, and more particularly to a location-force target path creator adapted to create a smooth form of a time function with a plurality of target values among in location, position, force or moment that are given for a force control system.

Where realizing a force control system for robots or machine tools, the process as shown in FIG. 11 is usually carried out. That is, at step 1 (hereinafter denoted as S1 in the figure), the instructions from an operator is interpreted as data as to location, force, position, moment, etc. Then, at step 2, a working region, a maximum speed, etc. are determined depending upon the data, etc. obtained at step 1 for calculating in what way a robot or the like is operated for its feasibility, thereby planning the path thereof. At step 3, the coefficient data, etc. for a target value function is calculated to establish a target value function, to thereafter calculate and output target paths in real time. At step 4 and the subsequent steps, feedback control is made based on the calculated target paths. At step 5, the target path data is applied to a mechanism section, such as a motor and a driver, of which force or torque is to be controlled so that the amount thereof is fed back at step 6. In the motion control structure as set forth above, the processes of step 1 through step 3 are for planning wherein target values in location and force are created.

However, although conventionally there have been often studies on force control shown in step 4 and the subsequent steps, it is the practical situation that studies were rarely made for the planning section. Meanwhile, as regard to studies on force control, there is often a case that the reference input to a force control system is limited to step inputting or it is handled as ambiguous one without definition. This seems to be a factor that the effectiveness cannot be appreciated to a full extent, even where a robust force control system can be applied to an actual system. On the other hand, where the location and position only are designed for target paths, they are, though effective for actuation such as gripping and releasing in three dimensions, difficult to apply to such a control operation that involves force of assembling, grinding and debarring, etc. If a force reference input is used for step input as above, a kind of impact occurs at non-continuous portions with a fear of causing residual vibrations, deformations, breakage, etc.

The present invention has been made in view of the conventionally-encountered problems, and it is the object of the present invention to provide a location-force target path creator which is capable of creating a smooth form of a time function with a plurality of target values among in location, position, force and moment given to a force control system.

SUMMARY OF THE INVENTION

In accordance with the present invention, there is structured a location-force target path creator for creating a smooth form of a time function from a plurality of target values in location, position, force and moment given for a force control system, the force control system having degrees of control freedom as to a plurality of ones among in location, position, force and moment, comprising: a node setting means for setting, as nodes, the target values together with time for which the target value is applied; a time region dividing means for projecting, as a logical sum in the degrees of control freedom, the nodes set by the node setting means onto a time axis to divide a time region; an element motion designing means for calculating a target path function in the form of a third order or fifth order polynominal while providing a boundary condition to each time region divided by the time region dividing means.

A motion plan with target path creation is tried for a hybrid control system involving location and force. That is, a target path as to force/moment, together with a location/position target path, are designed as a third order or fifth order polynominal so as to realize such arbitrary force/moment that a human acts upon an object in his actual operation. Specifically, determination is first made for a plurality of target values among in location, position, force and moment. The target values, together with time for applying the target value, are set as nodes. The nodes are determined as to degrees of control freedom. These nodes are projected onto a time axis. The projected nodes are represented as a logical sum for the degrees of freedom. As a result, a time region is divided into the number of nodes. The minimum unit of motion in a divided time region is taken as an "element motion". Then, a target path function is designed for the element motion. The target path function is designed in the form of a third order or fifth order polynominal. If a fifth order polynominal is adopted, it is considered that a function closer to human motion can be realized with higher approximation. The polynominal can be readily solved by providing boundary conditions thereto. A series of motions created by connecting, in order, a plurality of element motions is considered as a "unit motion". Also, a set of a plurality of unit motions is taken as a "motion". The target paths thus created is not independent on an element motion basis but constitutes a series of unit motions. Therefore, the acting of force or the like is smoothened to provide motions with higher analogous to human motion. This, in turn, can prevent residual vibrations, deformations or breakage from occurring at nodes.

BRIEF DESCRIPTION OF THE DRAWINGS

FIG. 7 is a diagram showing a method of creating a target path function using a third order polynominal;

FIG. 8 is a diagram showing a method of creating a target path function using a fifth order polynominal;

DETAILED DESCRIPTION OF THE PREFERRED EMBODIMENT

Explanations will be made hereinbelow on an embodiment of the present invention with reference to the drawings.

Figure 1:
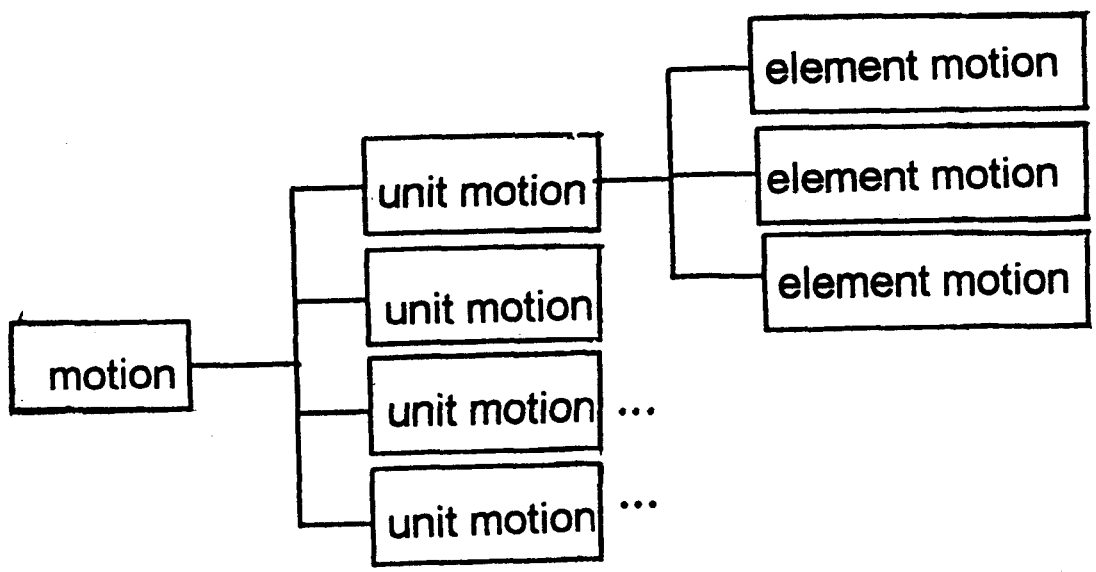
FIG. 1 is a diagram showing a relationship between a motion, unit motion, and an element motion.

FIG. 1 shows a relationship between a motion, a unit motion and an element motion. Here, it is assumed that an arbitrary "motion" can be represented by a movement in an arbitrary direction, a force applying movement in a direction perpendicular thereto, and a rotation about an arbitrary rotational axis or a motion for applying movement. It is however noted that it is not dealt with a case of rotation about an arbitrary rotational axis and application of a moment at a same time. Meanwhile, the moment is expressed as components about respective coordinate axes on an operational coordinate frame. The minimum unit of a motion created by time-dividing based on target values at particular time of the location, force, and position (or moment) designated by a designer is called a "element motion", and a motion created by connecting a series of element motions is called a "unit motion". Also, a set of a plurality of unit motions is defined as a "motion". For example, if a "motion" comprises a single "unit motion", then the "motion" consists of three element motions of an acceleration, uniform velocity, and deceleration of a location, force, and rotation (or moment).

Figure 2:
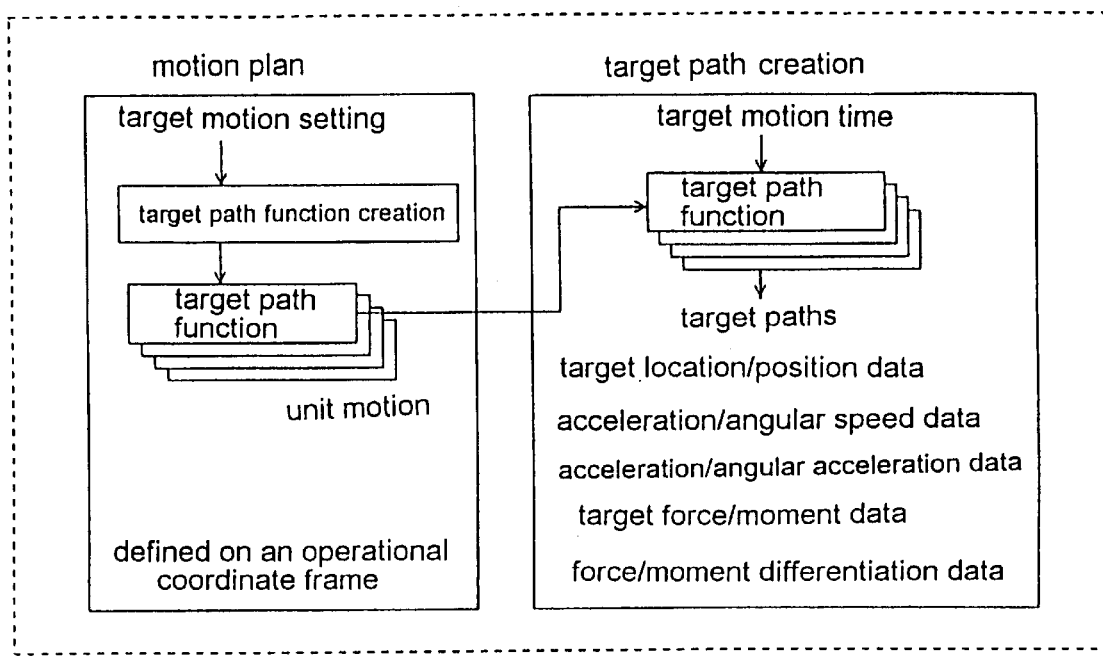
FIG. 2 is a diagram of showing a motion plan with target path creation.

Now, explanations will be made on motion plans and creations of target paths with reference to FIG. 2.

The motion plan is schemed by setting a target motion and thereafter creating a target path function. In creating a target path, a target path and target location or positional data are available by providing target motion time to an established target path function. Here, the "target motion" means a "target specification" for achieving a "motion" as above, and comprises respective parameters of "a location/position as to a degree of freedom to be controlled in location, a force/moment as to the degree of freedom to be controlled in force, a maximum speed/angular acceleration, an acceleration time period, an deceleration time period, variables representing a coordinate frame being considered, a degree of freedom in location control, and a variable representing a degree of freedom in force control" to be targeted. The "target path" refers to a data group such as "position/speed/acceleration" and "force/variation in time of force" obtained as an output of a "time function created based on a target motion". The "motion plan" means a process of determining a "operational target motion" as above to create each "target path function" corresponding to its element motion. The "target path creation" refers to a process of creating target path data by using a target path function. The "target operation time" means time t(k) (k=0, 1, 2, 3, 4, . . . ) at every renewal period (Tm) called a motion rate. The motion rate is usually set at a integer times of a servo rate (sampling time in control).

Now, explanations will be made on the target path and the coordinate frame of a control system.

Figure 3:
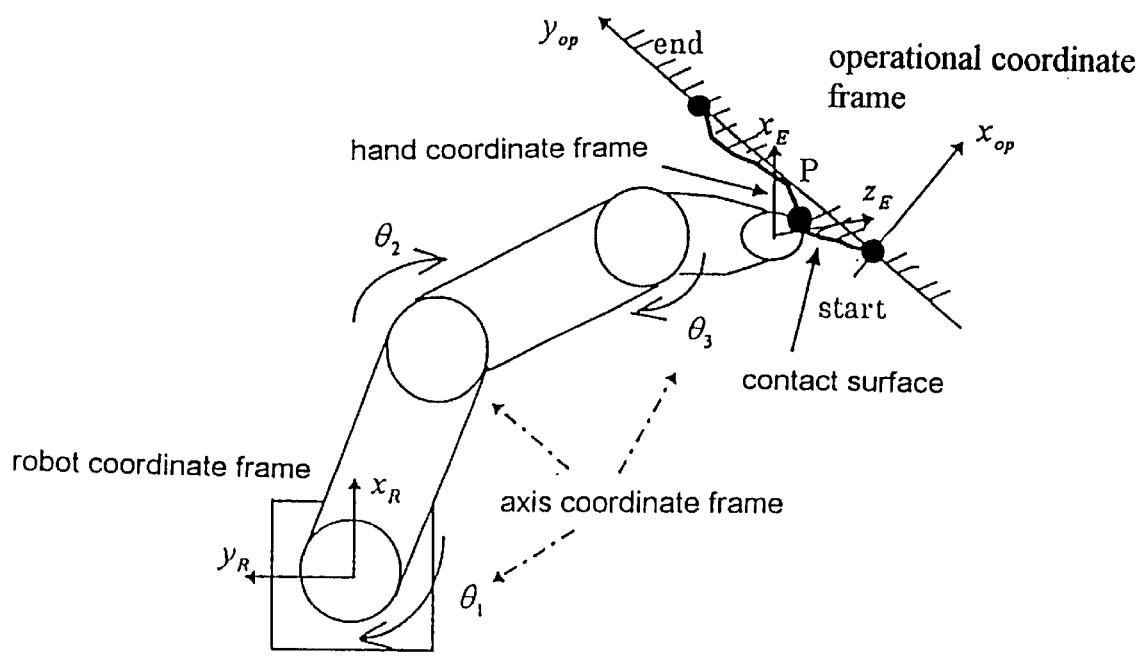
FIG. 3 is a diagram showing a relationship between an operational coordinate frame (OP), a robot coordinate frame (R), and an axis coordinate frame (θ)

FIG. 3 illustratively represents a relationship of an operational coordinate frame (OP), a robot coordinate frame (R), and an axis coordinate frame (θ). It is assumed that a target motion is planned on an operational coordinate frame (OP) for constituting an operational space to determine a target path of a time function. Where a control system is designed on the basis of an operational coordinate frame, it is employed, as it is, for inputting a reference into the control system. The above target path is transformed into a target path on a robot coordinate frame (R). Where the control system is designed on a basis of a robot coordinate frame, this result is used as a reference input to the control system. Where a control system in an axis coordinate frame (θ) is employed, a target path on the axis coordinate frame is further determined. In the FIG. 3 example, a tip of a hand depresses a wall in a normal direction while moving in an operational coordinate frame.

Now, explanations will be made on an actual motion plan.

Figure 4:
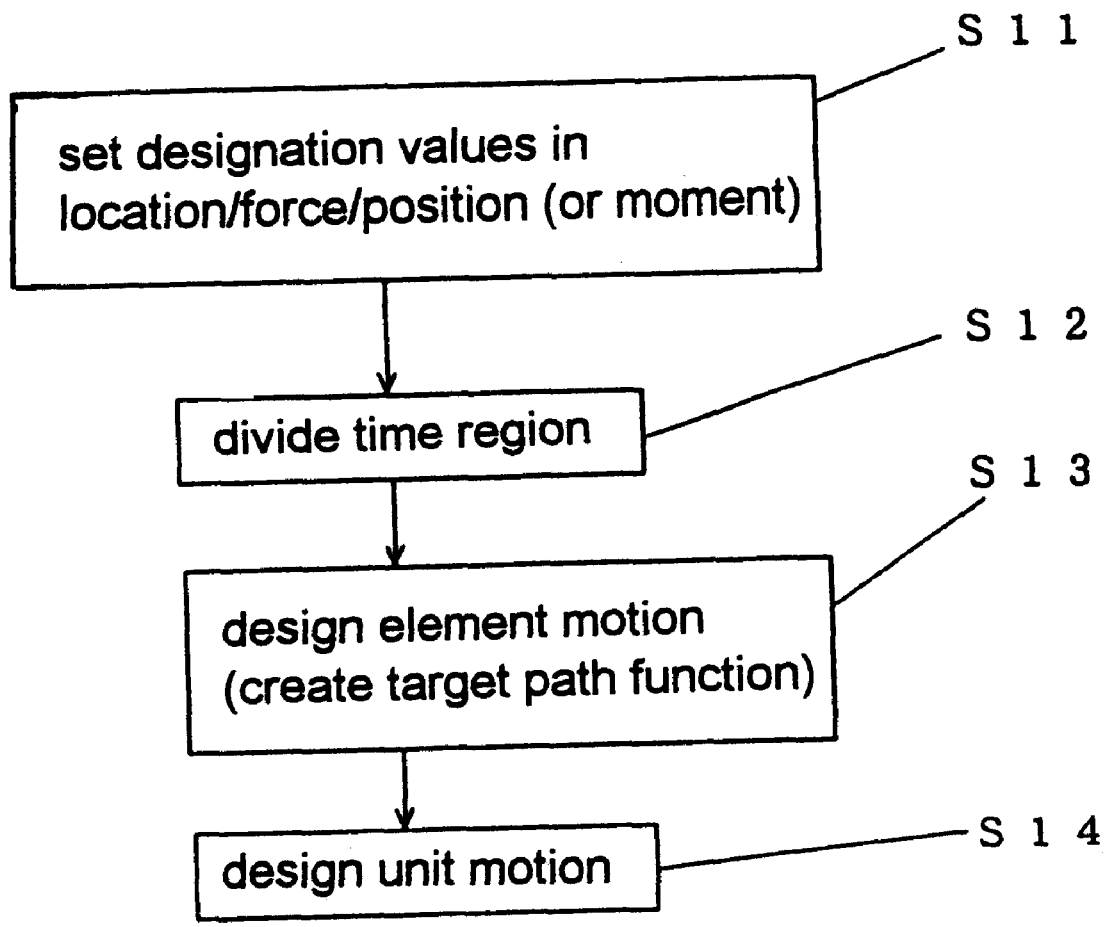
FIG. 4 is a diagram showing a motion plan.
Figure 5:
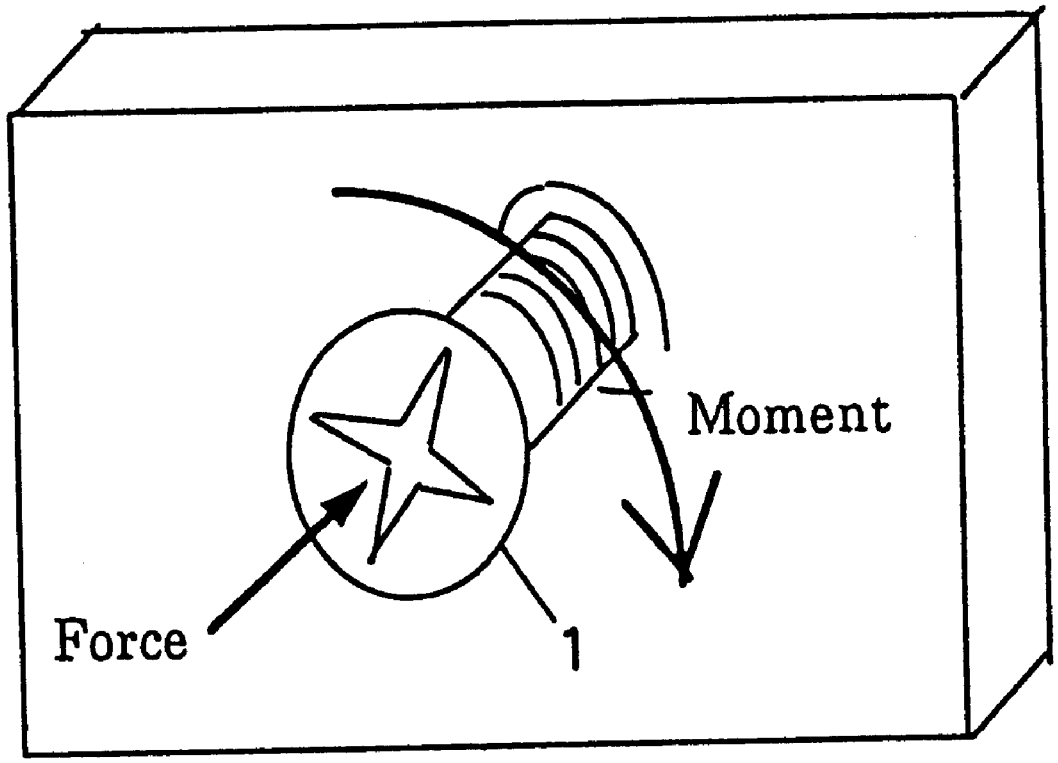
FIG. 5 is an illustrative view showing a force and moment being applied.
Figure 6A:
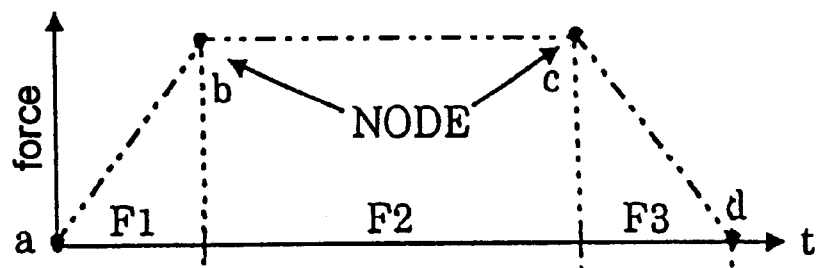
FIGS. 6A to 6E are a diagram showing a motion plan with target paths in force and moment.
Figure 6B:
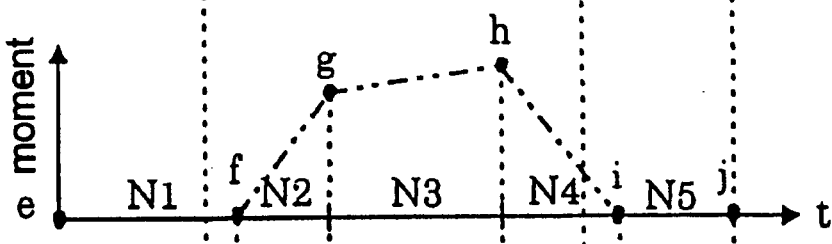
Figure 6C:
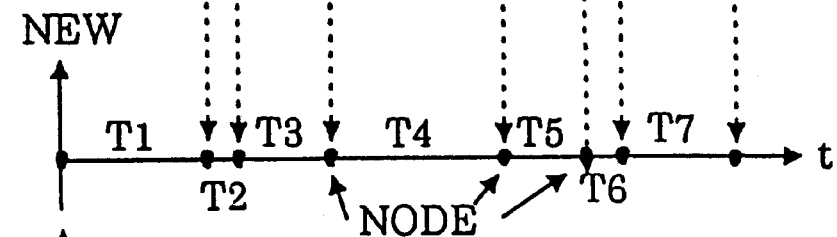
Figure 6D:
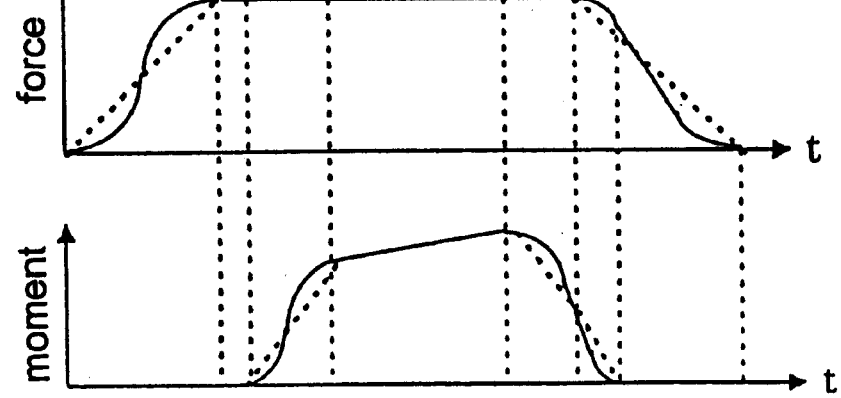
Figure 6E:
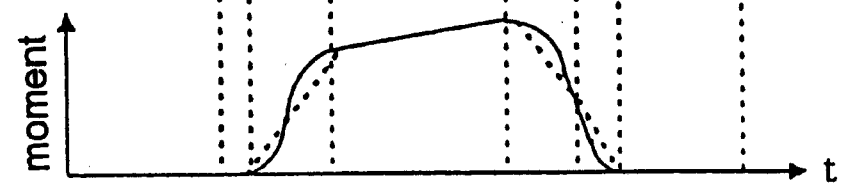

It is assumed that the setting of a target motion in an actual motion plan comprises four process steps (step 11 through step 14) as shown in FIG. 4. Here, an actual unit motion is considered on a case that a force and a moment are applied as an example. FIG. 5 shows a way that a force and a moment are applied to a screw 1. Meanwhile, the motion plan and the target path in this case is shown in FIG. 6. The designated force values for the screw 1 are shown in FIG. 6A. Here, the points a, b, c and d are nodes that represent the magnitude of a force set at each time point. Also, the designated moment values for the screw 1 are shown in FIG. 6B. Here, the points e, f, g, h, i and j are nodes that represent the magnitude of a moment set at each time point. In FIG. 6C, these two degrees of freedom are projected onto a time axis. The projection is performed on these two degrees of freedom in a manner not to discriminate between them. That is, the operation for this duration is to project a plurality of nodes existing on the two degrees of control freedom to the same time axis (logical sum ORed) and to create such new nodes that renders the magnitude in the vertical axis zero. Then, one kind of an acceleration and deceleration specification that defines an element motion within the time-divided region T1–T7 between nodes is determined to design a motion as targets in force and moment. The listing of a series of element motions provides one unit target motion (FIGS. 6D and 6E). In this embodiment, the motion comprises a single unit motion. Here, a target path function corresponding to the respective unit motions is designed in a manner as below. That is, a function is first supposed. In the case of a target path function using a third-order polynominal, supposition is made for two functions in a manner as shown in FIG. 7. One function V(t) corresponds to a first order differentiation of the other function P(t). $t_0$ is an initial time of the corresponding element motion, while $t_e$ is an end time of the corresponding element motion. $t_c$ shows a motion time period of the element motion. Boundary restricting conditions are given for the initial time $t_0$ and the end time $t_e$. The coefficients of the target path function can be determined by totally four restricting conditions (initial value, initial value of first order differentiation, final value, and final value of first order differentiation). Therefore, the target path function can be determined. The target path function in design may employ a fifth order polynominal. In such a case, three functions are supposed in a manner as shown in FIG. 8. One function V(t) corresponds to a first order differentiation of another function P(t). Further, another function A(t) corresponds to a first order differentiation of V(t). The coefficients of this target path function can be determined by providing totally six restricting conditions (initial value, initial value of first order differentiation, initial value of second order differentiation, final value, final value of first order differentiation, final value of second order differentiation). Accordingly, the target path function can be determined. In this manner, the target paths in force and moment can be placed in smooth continuation as shown in FIGS. 6D and 6E by providing boundary restricting conditions and solving the target path function. Therefore, there is no possibility of giving impacts and hence residual vibrations, deformations and breakage.

Now, explanations will be made on the case that the change in location, force, and position (or moment) is applied.

Figure 9:
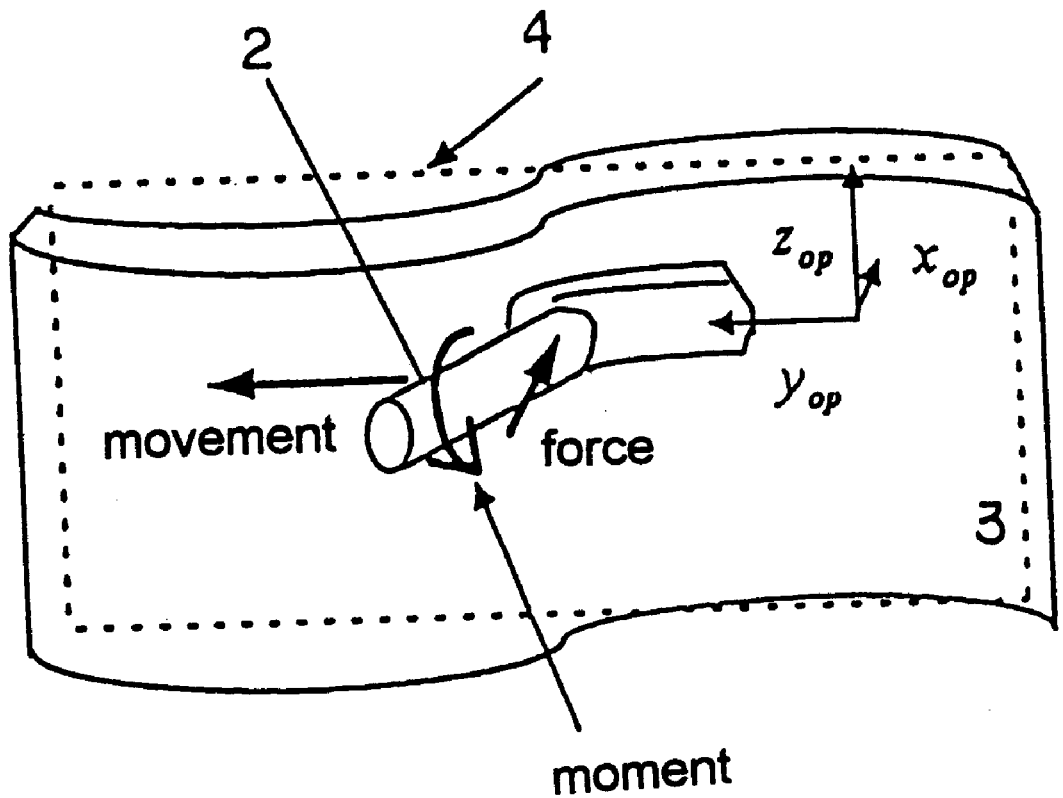
FIG. 9 is an illustrative view of movement, force and moment being applied.

Assumption is made on grinding operation with a tool 2 as shown in FIG. 9. It is supposed for a case that a force is applied in an $x_{op}$ direction of an operational coordinate frame, a movement is made in $y_{op}$ direction, and simultaneously a moment is applied about an arbitrarily set rotational axis.

Figure 10:
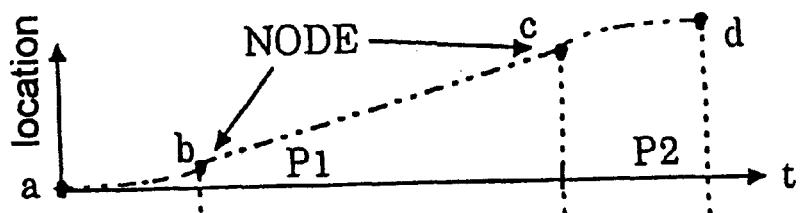
FIGS. 10A to 10G are a diagram showing a motion plan with target paths in movement, force and moment.
Figure 10:
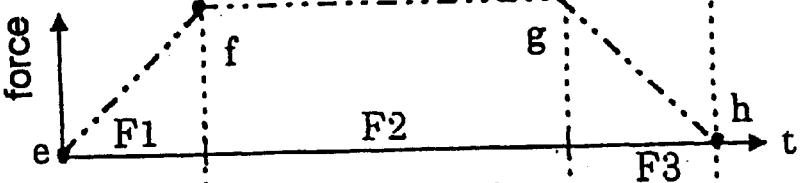
Figure 10:
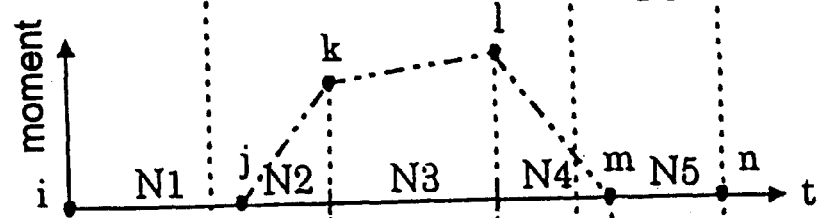
Figure 10:
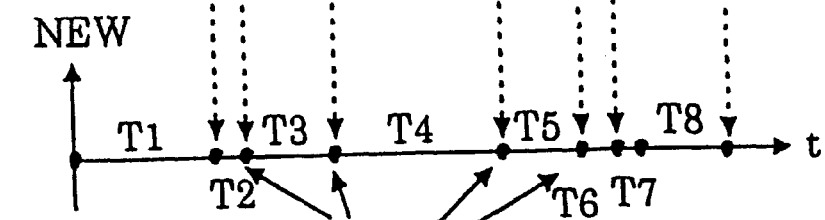
Figure 10:
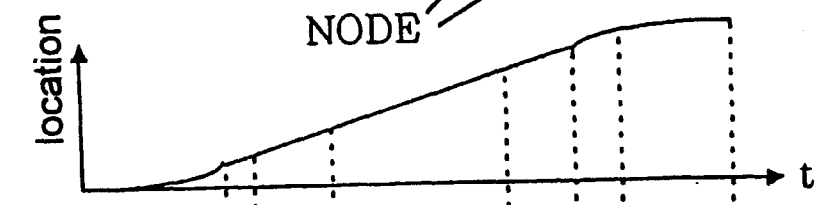
Figure 10:
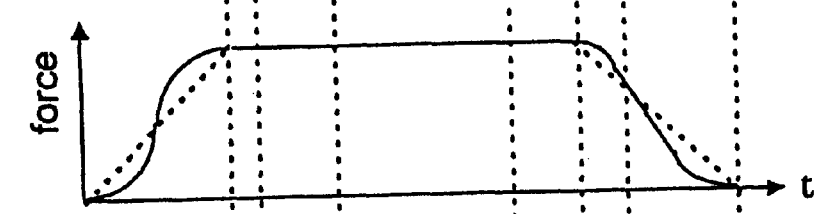
Figure 10:
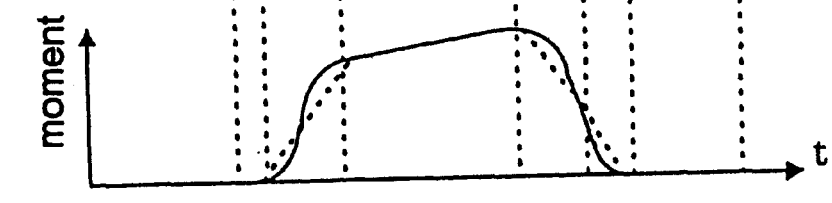
Figure 11:
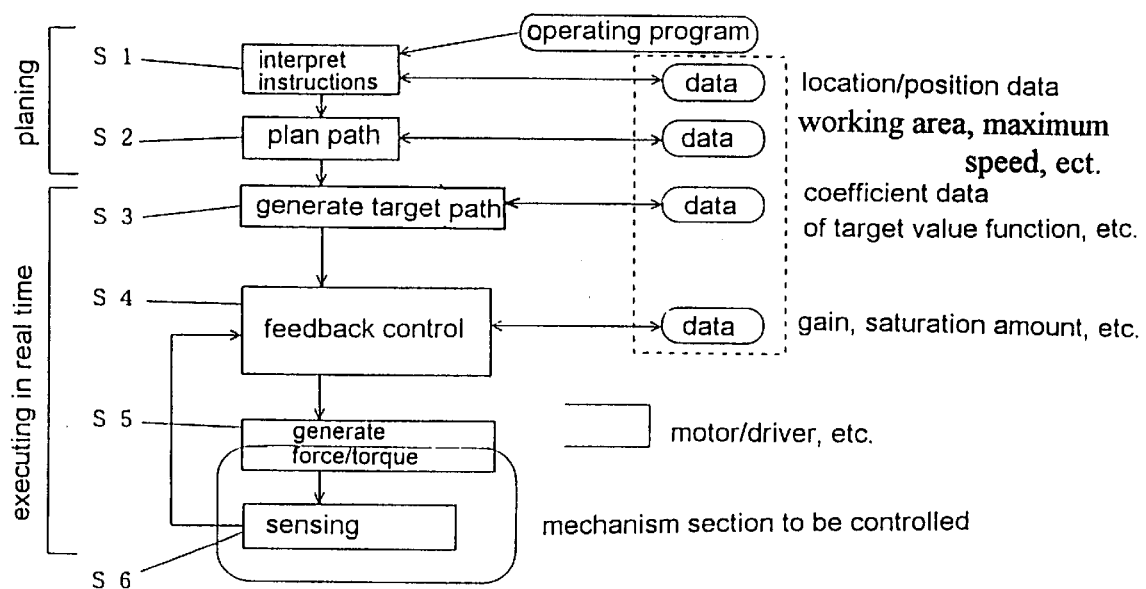
FIG. 11 is a diagram showing a function and structure of a motion control.

Designations are given at a particular time for location designation values (FIG. 10A), force designation values (FIG. 10B), and moment designation values (FIG. 10C). The three degrees of control freedom are projected on a time axis as shown in FIG. 10D. At this time, a plurality of nodes existing in the respective three degrees of control freedom are projected on a same time axis (logical sum ORed) to create such new nodes that the magnitude in a vertical axis is at zero. Then a kind of an acceleration and deceleration specification is determined to define element motions within each new time-divided regions T1–T8, designing a motion as targets in location, force, and moment. By listing a series of element motions, one unit target motion is obtained (FIG. 10E through 10G). In this embodiment the motion comprises a single unit motion. Also, the motion plan and target path at this time are also applicable to one that is deviated as a hypothetical curved surface 4, differently from the actual curved surface 3 shown by the solid lines in FIG. 9.

The technique of designing the target path function by using a third order polynominal or a fifth order polynominal is similar to the above-stated case wherein two degrees of control freedom are given to the force and moment.

As explained above, the present invention is provided with a node setting means, a time region dividing means and an element motion designing means so that a plurality of target values among in location, position, force, and moment can be created in a smooth form of a time function. Therefore, the force or the like is smoothened during its application way, and it is possible to obtain motions which closely resemble human motions. This, in turn, serves to prevent residual vibrations, deformations or breakage from occurring at the nodes.

What is claimed is:

1. A location-force target path creator for creating a smooth target path function from a plurality of target values given for a force control system having a plurality of degrees of control freedom, the location-force target path creator comprising:

node setting means for setting, as nodes, the target values for the force control system together with times for which the target values are applied, the target values comprising values of location, position, force and moment;

time region dividing means for projecting the nodes onto a time axis having a time region and for dividing the time region into a plurality of time regions; and element motion calculating means for calculating a target path function for an element motion by applying a boundary condition to each of the plurality of time regions.

2. A location-force target path creator according to claim 1; wherein the element motion calculating means calculates the target path function in the form of a third order polynomial.

3. A location-force target path creator according to claim 2; wherein the nodes set by the node setting means represent degrees of control freedom; and wherein the time region dividing means projects the degrees of control freedom onto the time axis as a logical sum of the degrees of control freedom.

4. A location-force target path creator according to claim 1; wherein the nodes set by the node setting means represent degrees of control freedom; and wherein the time region dividing means projects the degrees of control freedom onto the time axis as a logical sum of the degrees of control freedom.

5. A location-force target path creator according to claim 1; wherein the element motion calculating means calculates the target path function in the form of a fifth order polynomial.

6. A location-force target path creator according to claim 5; wherein the nodes set by the node setting means represent degrees of control freedom; and wherein the time region dividing means projects the degrees of control freedom onto the time axis as a logical sum of the degrees of control freedom.

7. A target path creating device comprising: determining means for determining target values among values of location, position, force and moment for a force control system; node setting means for setting the target values as nodes; projecting means for projecting the nodes onto a time axis having a time region and for dividing the time region into a plurality of time regions; and calculating means for calculating a target path function by applying a boundary condition to each of the plurality of time regions.

8. A target path creating device according to claim 7; wherein the calculating means calculates the target path function in the form of a third order polynomial.

9. A target path creating device according to claim 8; wherein the nodes set by the node setting means represent degrees of control freedom; and wherein the projecting means projects the degrees of control freedom onto the time axis as a logical sum of the degrees of control freedom.

10. A target path creating device according to claim 7; wherein the calculating means calculates the target path function in the form of a third order polynomial.

11. A target path creating device according to claim 10; wherein the nodes set by the node setting means represent degrees of control freedom; and wherein the projecting means projects the degrees of control freedom onto the time axis as a logical sum of the degrees of control freedom.

12. A target path creating device comprising: determining means for determining target values among values of location, position, force and moment for a force control system; node setting means for setting the target values as nodes representing degrees of control freedom; means for projecting the degrees of control freedom onto a time axis as a logical sum of the degrees of control freedom and for dividing a time region of the time axis into a plurality of time regions; and calculating means for calculating a target path function by applying a boundary condition to each of the plurality of time regions.

* * * * *